(12) United States Patent
Wang et al.

(10) Patent No.: US 10,156,946 B2
(45) Date of Patent: Dec. 18, 2018

(54) CAPACITIVE TOUCH SCREEN AND MASK DEVICE FOR MANUFACTURING THE SAME

(71) Applicant: Shenzhen Laibao Hi-Tech Co., Ltd., Shenzhen, Guangdong (CN)

(72) Inventors: Shimin Wang, Guangdong (CN); Zeli Zhu, Guangdong (CN)

(73) Assignee: SHENZHEN LAIBAO HI-TECH CO., LTD., Shenzhen (CN)

( * ) Notice: Subject to any disclaimer, the term of this patent is extended or adjusted under 35 U.S.C. 154(b) by 151 days.

(21) Appl. No.: 15/036,783

(22) PCT Filed: May 29, 2015

(86) PCT No.: PCT/CN2015/080168
§ 371 (c)(1),
(2) Date: May 13, 2016

(87) PCT Pub. No.: WO2016/119350
PCT Pub. Date: Aug. 4, 2016

(65) Prior Publication Data
US 2016/0349877 A1 Dec. 1, 2016

(30) Foreign Application Priority Data
Jan. 29, 2015 (CN) .......................... 2015 1 0045393

(51) Int. Cl.
*G06F 3/044* (2006.01)
(52) U.S. Cl.
CPC .... *G06F 3/044* (2013.01); *G06F 2203/04103* (2013.01)

(58) Field of Classification Search
CPC ...................... G06F 2203/04103; G06F 3/044
See application file for complete search history.

(56) References Cited

FOREIGN PATENT DOCUMENTS

| CN | 103198885 A | 7/2013 |
|----|-------------|--------|
| CN | 103336639 A | 10/2013 |
| CN | 203773525 U | 8/2014 |

OTHER PUBLICATIONS

International Search Report, International application No. PCT/CN2015/080168, dated Oct. 26, 2015. SIPO: Beijing, CN.

*Primary Examiner* — Abhishek Sarma
(74) *Attorney, Agent, or Firm* — Coats & Bennett, PLLC

(57) ABSTRACT

A capacitive touch screen includes a substrate (01), a touch electrode layer (02), and a decorative layer (03). The substrate (01) has a first surface, the first surface includes a first region (011) and a second region (012), and the second region (012) is positioned on one side of the first region (011), the decorative layer (03) is formed on the second region (012). The touch electrode layer (02) is formed on the first region (011) of the first surface, and the touch electrode layer (02) extends above the decorative layer (03) on the second region (012), the touch electrode layer (02) includes a plurality of touch patterns, two adjacent touch patterns on the first region (011) are provided with a first gap (04) therebetween, two adjacent touch patterns on the second region (012) are provided with a second gap (05) therebetween, and a width of the second gap (05) is greater than a width of the first gap (04).

9 Claims, 4 Drawing Sheets

CAPACITIVE TOUCH SCREEN AND MASK DEVICE FOR MANUFACTURING THE SAME

FIELD OF THE INVENTION

The present disclosure relates to a field of touch technology, and more particularly, relates to a capacitive touch screen and a mask device for manufacturing the capacitive screen.

BACKGROUND OF THE INVENTION

A common capacitive touch screen includes at least one substrate. The substrate is provided with a touch electrode thereon. The touch electrode generally includes an inducing electrode (TX) and a detecting electrode (RX). As a common electrode structure, the inducing electrode and the detecting electrode can be positioned on one layer, and intersects with each other according to an electrode row-electrode column form. A capacitance is generated between the including electrode and the adjacent detection electrode. In order to meet a requirement of the touch performance on the edge of a touch product, the electrode pattern region should extends outwardly from the visible area (VA) to the ink BM (black matrix) region. The characteristics such as impedance and capacitance of the capacitor are influenced due to an introduction of the dielectric substance BM, which results in a characteristic difference between the BM region and the VA area, and further leading to a touch sensitivity difference. Furthermore, due to the introduction of the BM, the manufacturing of the electrode patterns on the BM region and the VA area are different, for example, their etching rates are different, and the etching rate of the electrode on the BM region is difficult to be controlled.

SUMMARY OF THE INVENTION

Therefore, it is necessary to provide a capacitive touch screen, aiming at eliminating an influence to a touch electrode characteristics caused by ink, and ensuring a touch performance consistence between an ink region and a non-ink region, and facilitating to process.

A capacitive touch screen includes: a first substrate having a first surface, the first surface including a first region and a second region, and the second region being positioned on at least one side of the first region; a touch electrode layer formed on the first region of the first surface; and a decorative layer formed on the second region; wherein the touch electrode layer extends above the decorative layer on the second region, the touch electrode layer includes a plurality of touch patterns, two adjacent touch patterns located on the first region are provided with a first gap therebetween, two adjacent touch patterns located on the second region are provided with a second gap therebetween, and a width of the second gap is greater than a width of the first gap.

A mask device for manufacturing a capacitive touch screen includes: a substrate having a second surface, and the second surface including a third region and a fourth region, the fourth region being positioned on at least one side of the third region; and a shielding layer positioned on the third region of the second surface and extending to the fourth region, wherein the shielding layer includes a plurality of shielding patterns, two adjacent shielding patterns on the third region are provided with a third gap therebetween, two adjacent shielding patterns on the fourth region are provided with a fourth gap therebetween, a width of the fourth gap is greater than a width of the third gap.

A touch display device includes: a display module including two substrates and a liquid crystal molecular layer sandwiched between the two substrates, and a surface of one substrate is provided with a TFT array; a common electrode positioned on one substrate which is located on a light emitting side; and a color filter, wherein one surface of the color filter is provided, with a color filter film, the other surface of the color filter is provided with the decorative layer and the touch electrode layer described above.

By improving the structure of the touch electrode, the gaps between the touch patterns on the first region (e.g., the visible area) and the second region (the region where the decorative layer located, the ink region for example) are different, and a width of the second gap of the second region is greater than a width of the first gap on the first region. Such improvement has following advantages: on one aspect, due to an introduction of the decorative layer, the capacitance characteristics of the first region and the second region are different. The capacitance can generally be increased when the width of the second gap is increased, and as the same time, the capacitance can be decreased, therefore, the influence brought by the decorative layer can be eliminated to some extent, thus ensuring a same touch sensitivity on different regions. On another aspect, due to the decorative layer, the etching rate of the electrode on the first region and the second region are different, the etching rate of the electrode on the second region is slower and is difficult to be controlled, then when the second gap is broadened, it is convenient for adjusting the etching rate and processing.

BRIEF DESCRIPTION OF THE DRAWINGS

These and other features of the present invention will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION OF THE EMBODIMENTS

Figure 1:
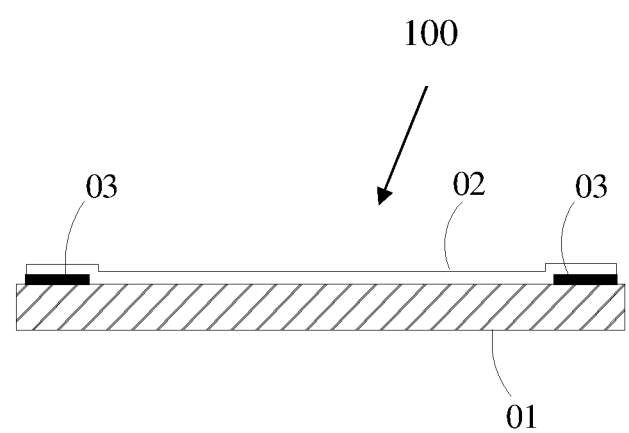
FIG. 1 is a cross-sectional view of a capacitive touch screen according to an embodiment.

Embodiments of the invention are described more fully hereinafter with reference to the accompanying drawings. The various embodiments of the invention may, however, be embodied in many different forms and should not, be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
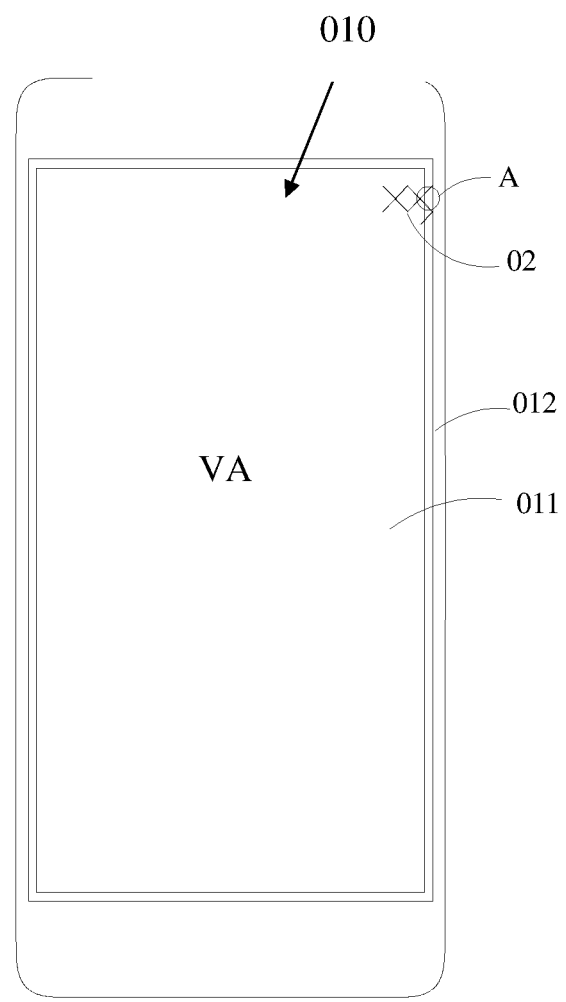
FIG. 2 is a plan view of the capacitive touch screen according to an embodiment.

Referring to FIG. 1 and FIG. 2, a capacitive touch screen 100 according to one embodiment includes a substrate 01, a touch electrode layer 02, and a decorative layer 03. The substrate 01 is provided with a first surface 010. The first surface 010 includes a first region 011 and a second region 012. The second region 012 is positioned on one side of the first region 011, or alternatively, the second region 012 can be positioned on two opposite sides of the first region 011, or the second region 012 surrounds the first region 011. The decorative layer 03 is formed on the second region 012. The first region 011 is generally corresponding to a visible area, the second region 012 is corresponding to a non-visible area, which is provided with the decorative layer 03. The decorative layer 03 can be made by opaque material such as black, white or color ink. The touch electrode layer 02 is formed on the first region 011 of the first surface 010, and extends above the decorative layer 03 on the second region 012. The touch electrode layer 02 includes a plurality of touch patterns. Two adjacent touch patterns located on the first region 011 are provided with a first gap 04 therebetween. Two adjacent touch patterns located on the second region 012 are provided with a second gap 05 therebetween. A width of the second gap 05 is greater than a width of the first gap 04.

In one embodiment, the touch pattern can include a plurality of first electrode arrays and a plurality of second electrode arrays. The first electrode array and the second electrode array intersect with each other. The first electrode array includes a plurality of first electrode units 021 and a plurality of connecting bands 022 interconnecting two adjacent first electrode units 021. The connecting band 022 can be integrally formed with the first electrode unit 022. The second electrode array is divided into a plurality of second electrode units 023 by the first electrode array. Two adjacent second electrode units 023 are connected to each other via a connecting bridge 024 which bridges the connecting band 022. The connecting band 022 is isolated from the connecting bridge 024 via an insulating block. The first electrode unit 021 and the adjacent second electrode unit 023 which are positioned on the first region 011 cooperatively form the first gap 04 therebetween. The first electrode unit 021 and the adjacent second electrode unit 023 which are positioned on the second region 012 cooperatively form the second gap 05 therebetween.

Figure 3:
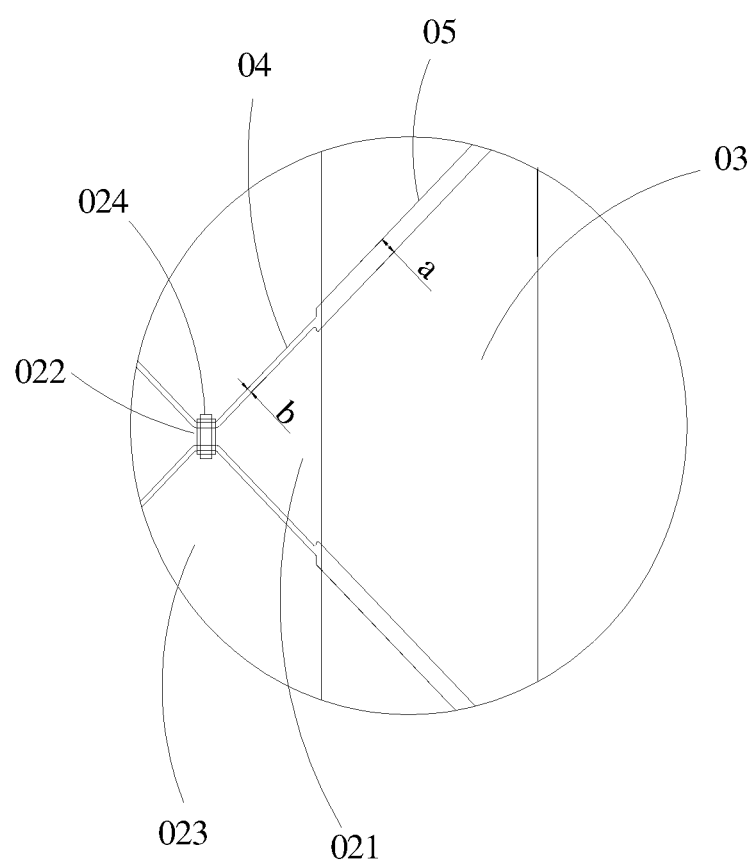
FIG. 3 is an enlarged view in correspondence with the portion A of FIG. 2.

As shown in FIG. 3, taking a rectangular (but not limited to rectangular) electrode unit for an example, the first electrode unit 021 and the second electrode unit 023 which are positioned on the second region 012 are provided with the second gap 05 therebetween, the second gap 05 has a width a, in the first region 011, the first electrode unit 021 and the second electrode unit 023 are provided with the first gap 04 therebetween, the first gap 04 has a width b. The width a of the second gap 05 is greater than the width b of the first gap 04. In one embodiment, a≥2b. In the embodiment, a=100 um, b=30 um.

In the present embodiment, the structure of the touch electrode is improved, it allows the gaps between the touch patterns on the first region 011 and the second region 012 to be different, the width a of the second gap 05 of the second region 012 is greater than the width b of the first gap 04 on the first region 011, such improvement has advantages as follows: on one aspect, due to an introduction of the decorative layer 03, the capacitance characteristics of the first region 011 and the second region 012 are different, and the capacitance can generally be increased, when the width of the second gap 05 is increased, the capacitance can be decreased, therefore, the influence brought by the decorative layer 03 can be eliminated to some extent, thus ensuring a same touch sensitivity on different regions. On another aspect, due to the decorative layer 03, the etching rate of the electrode on the first region 011 and the second region 012 are different, the etching rate of the electrode on the second region 012 is slower and is difficult to be controlled, then when the second gap 05 is broadened, it is convenient for adjusting the etching rate and processing.

In one embodiment, because the gap between the first electrode unit 021 and the second electrode unit 023 on the second region 012 is relative broadened, thus the gap between two adjacent first electrode units 021 and the gap between two adjacent second electrode units 023 are enlarged, therefore, a length of the connecting bridge 024 connecting two adjacent second electrode units 023 is longer than a length of the connecting bridge 024 on the first region 011.

Furthermore, the connecting bridge 024 can be broadened to improve a stability of a connection of the connecting bridge 024. The broadened connecting bridge 024 can reduce the impedance of the second electrode array, thus improving a touch performance.

Similarly, as the gap between the first electrode units 021 is increased, the connecting band 022 interconnecting two adjacent first electrode units 021 can also be lengthened, and can further be broadened, and then the impedance of the first electrode array is reduced, improving a touch performance.

In one embodiment, the substrate 01 is a substrate dedicated to support the touch electrode layer 02, and a covering plate is provided to cover a surface of the substrate 01, the surface is provided with the touch electrode layer 02 and the decorative layer 03. In the other embodiment, the covering plate can serve as a substrate, and the touch electrode layer 02 and the decorative layer 03 is positioned on an inner surface of the covering plate. In another embodiment, the touch electrode layer 02 and the decorative layer 03 can also be positioned on a surface of a CF (color filter) substrate, and then a coving plate covers the CF substrate.

A touch display device according to one embodiment includes a display module. The display module includes two substrates and a liquid crystal molecular layer sandwiched between the two substrates. A surface of one substrate is provided with a TFT (Thin Film Transistor) array. The substrate which is located on the light emitting side can be provided with a common electrode, and also can support a color filter film. Or else, the CF substrate can be additionally provided, one surface of the CF substrate is provided with a color filter film, the other surface of the CF substrate is provided with above decorative layer and the touch electrode layer.

In one embodiment, the gap between the touch patterns on the second region is broadened, thereby eliminating a capacitance characteristic difference between the first region and the second region which is caused by the decorative layer, and ensuring a consistence of the touch sensitivity, and it is convenient for adjusting the etching rate by broadening the gap between the touch patterns, facilitating to enhance a yield of the product. Meanwhile, by virtue of broadening the connecting bridge and the connecting hand, the impedance of the touch electrode can be reduced, the touch experience can be improved. The touch electrode structure is suitable for applying to a touch screen which requires a strengthen touch sensitivity on the edge of the touch screen. The touch screen can be OGS (One Glass Solution) touch screen, it has a simple structure and can be easily realized by ordinary technical art.

Figure 4:
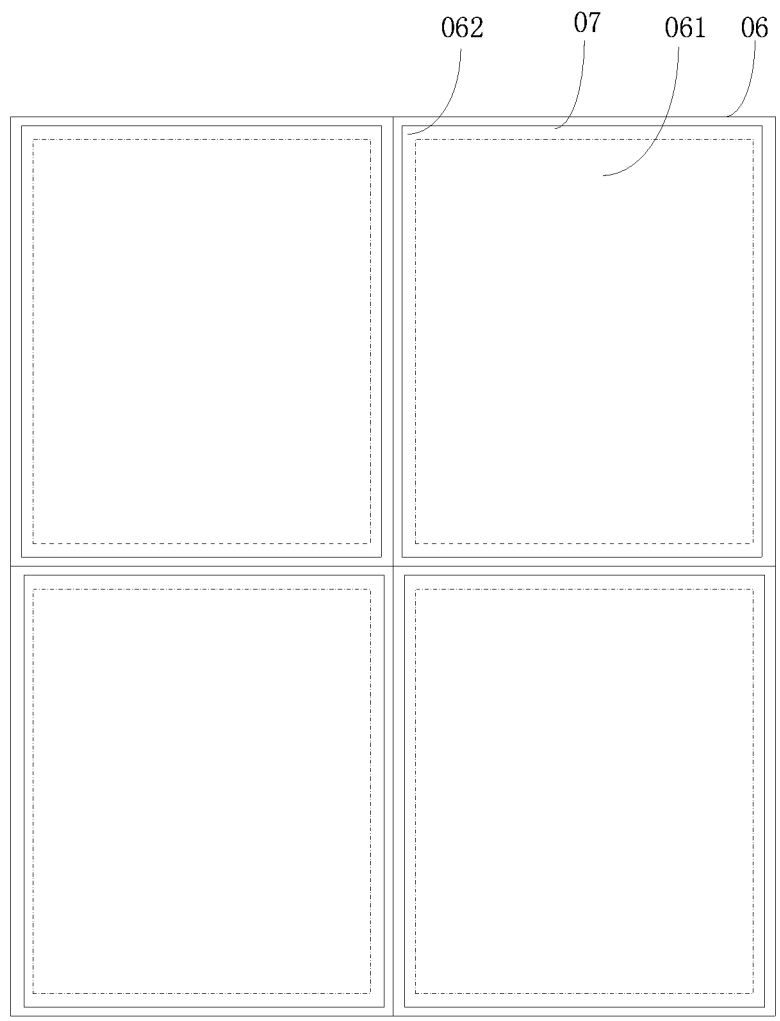
FIG. 4 is a plan view of a mask device according to an embodiment.

In one embodiment, a mask device is provided as an auxiliary fixture to manufacture a capacitive touch screen, and the mask device has a structure corresponding to above described touch screen. Referring to FIG. 4, The mask device includes a substrate 06 and a shielding, layer 07. The substrate 06 has a second surface, and the second surface includes a third region 061 and a fourth region 062. The fourth region 062 is positioned on at least one side of the third region 061. The shielding layer 07 is positioned on the third region 061 of the second surface, and the shielding layer 07 extends to the fourth region 062. The shielding layer 07 includes a plurality of shielding patterns, two adjacent shielding patterns located on the third region 061 are provided with a third gap (not shown) therebetween, two adjacent shielding patterns located on the fourth region 062 are provided with a fourth gap (not shown) therebetween, the fourth gap has a width greater than a width of the third gap. When manufacturing the capacitive touch screen, the region formed by the third region 061 and the fourth region 062 is corresponding to the capacitive touch screen. Specifically, the third region 061 is corresponding to the first region 011 of the capacitive touch screen, the fourth region 062 is corresponding to the second region 012. The shielding layer 03 is employed for manufacturing the touch electrode layer 02, the shielding patterns are corresponding to above described touch patterns, and the first gap and the second gap can be controlled according to the third gap and the fourth gap.

The mask device provided by above described embodiment is employed to produce above described touch capacitive screen, causing the gap on the first region to be different from the gap on the second region, thereby eliminating a touch sensitivity difference between the first region and the second region whereby the difference is caused by the decorative layer, and it is convenient for etching the electrode, and little process and cost are required, it is suitable for manufacturing the capacitive touch screen.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A capacitive touch screen, comprising:
   a first substrate having a first surface, the first surface comprising a first region and a second region, and the second region being positioned on at least one side of the first region;
   a touch electrode layer formed on the first region of the first surface; and
   a decorative layer formed on the second region;
   wherein the touch electrode layer extends above the decorative layer on the second region, the touch electrode layer comprises a plurality of touch patterns, two adjacent touch patterns located on the first region are provided with a first gap therebetween, two adjacent touch patterns located on the second region are provided with a second gap therebetween, and a width of the second gap is greater than a width of the first gap;
   wherein the touch patterns comprise a plurality of first electrode arrays and a plurality of second electrode arrays, the first electrode array and the second electrode array intersect with each other, the first electrode array comprises a plurality of first electrode units and a plurality of connecting bands interconnecting two adjacent first electrode units, the second electrode array comprises a plurality of second electrode units and a plurality of connecting bridges each bridging one connecting band, the first electrode unit and the adjacent second electrode unit which are positioned on the first region cooperatively form the first gap therebetween, the first electrode unit and the adjacent second electrode unit which are positioned on the second region cooperatively form the second gap therebetween.

2. The capacitive touch screen according to claim 1, wherein the plurality of first electrode arrays are equally spaced along a first direction, the plurality of second electrode arrays are equally spaced along a second direction, the first direction is perpendicular to the second direction, the connecting bridge on the second region has a length greater than a length of the connecting bridge on the first region.

3. The capacitive touch screen according to claim 2, wherein the connecting bridge on the second region has a width greater than a width of the connecting bridge on the first region.

4. The capacitive touch screen according to claim 1, wherein the connecting band on the second region has a length greater than a length of the connecting band on the first region, the connecting band on the second region has a width greater than a width of the connecting band on the first region.

5. The capacitive touch screen according to claim 1, wherein a width of the second gap is more than twice of a width of the first gap.

6. The capacitive touch screen according to claim 5, wherein a width of the second gap is 100 um, and a width of the first gap is 30 um.

7. The capacitive touch screen according to claim 1, wherein the second region is adjacent to and surrounds the first region, the decorative layer is adjacent to and surrounds the first region of the first surface.

8. A mask device for manufacturing a capacitive touch screen, comprising:
   a substrate having a second surface, and the second surface comprising a third region and a fourth region, the fourth region being positioned on at least one side of the third region; and
   a shielding layer positioned on the third region of the second surface and extending to the fourth region, wherein the shielding layer comprises a plurality of shielding patterns, two adjacent shielding patterns on the third region are provided with a third gap therebetween, two adjacent shielding patterns on the fourth region are provided with a fourth gap therebetween, a width of the fourth gap is greater than a width of the third gap;
   wherein the shielding pattern comprises a plurality of first electrode arrays and a plurality of second electrode arrays, the first electrode array and the second electrode array intersect with each other, the first electrode array comprises a plurality of first electrode units and a plurality of connecting bands interconnecting two adjacent first electrode units, the second electrode array comprises a plurality of second electrode units and a plurality of connecting bridges each bridging one connecting band, the first electrode unit and the adjacent second electrode unit which are positioned on the first region cooperatively form the third gap therebetween, the first electrode unit and the adjacent second electrode unit which are positioned on the second region cooperatively form the fourth gap therebetween.

9. A touch display device, comprising:

a display module comprising two substrates and a liquid crystal molecular layer sandwiched between the two substrates, and a surface of one substrate is provided with a TFT (Thin Film Transistor) array;

a common electrode positioned on one substrate which is located on a light emitting side; and a color filter, wherein one surface of the color filter is provided with a color filter film, the other surface of the color filter is provided with the decorative layer and the touch electrode layer, the touch electrode comprising a plurality of touch patterns, two adjacent touch patterns located on the first region with a first gap therebetween, two adjacent touch patterns located on the second region with a second gap therebetween, and a width of the second gap is greater than a width of the first gap;

wherein the touch patterns comprise a plurality of first electrode arrays and a plurality of second electrode arrays, the first electrode array and the second electrode array intersect with each other, the first electrode array comprises a plurality of first electrode units and a plurality of connecting bands interconnecting two adjacent first electrode units, the second electrode array comprises a plurality of second electrode units and a plurality of connecting bridges each bridging one connecting band, the first electrode unit and the adjacent second electrode unit which are positioned on the first region cooperatively form the first gap therebetween, the first electrode unit and the adjacent second electrode unit which are positioned on the second region cooperatively form the second gap therebetween.

* * * * *